United States Patent [19]

Mullet et al.

[11] Patent Number: 5,090,512
[45] Date of Patent: Feb. 25, 1992

[54] FOUR-WHEEL COORDINATED STEERING MULTI-PURPOSE TRACTOR

[75] Inventors: Paul W. Mullet, Hesston; Elmer D. Voth, Newton, both of Kans.

[73] Assignee: Excel Industries, Inc., Hesston, Kans.

[21] Appl. No.: 535,109

[22] Filed: Jun. 8, 1990

[51] Int. Cl.⁵ ............................................ B60K 17/358
[52] U.S. Cl. ....................................... 180/236; 180/234; 180/140; 280/91; 280/99; 56/DIG. 22
[58] Field of Search .............. 180/140, 234, 236, 242; 280/91, 98, 99, 104; 56/DIG. 22; 74/496

[56] References Cited

U.S. PATENT DOCUMENTS

| | | | |
|---|---|---|---|
| 2,763,331 | 9/1956 | Le Tourneau | 280/91 |
| 2,910,131 | 10/1959 | Krotz | 280/91 |
| 3,504,928 | 4/1970 | Reimer | 280/91 |
| 3,596,730 | 8/1971 | Cecce | 280/91 |
| 4,043,419 | 8/1977 | Larson et al. | 180/132 |
| 4,289,214 | 9/1981 | Spence | 180/234 |
| 4,364,577 | 12/1982 | Tateyama et al. | 74/496 |
| 4,373,603 | 2/1983 | Nelson | 180/236 |
| 4,852,679 | 8/1989 | Fry | 180/234 |
| 4,914,894 | 4/1990 | Gieger | 56/DIG. 22 |
| 4,957,183 | 9/1990 | Mullet et al. | 280/91 |

FOREIGN PATENT DOCUMENTS 0097469 4/1988 Japan ......................... 280/91

*Primary Examiner*—Mitchell J. Hill
*Assistant Examiner*—A. M. Boehler
*Attorney, Agent, or Firm*—Edward L. Brown, Jr.

[57] ABSTRACT

A four-wheel mobile vehicle including provision for controlling the steering position of each of the four (4) wheels so that every wheel's rolling axis will intersect at a common point around which the vehicle will turn. The control is provided by a pair of cables, one on each side of the vehicle which interconnect a pair of front and back wheels to turn each pair through similar angles in the opposite direction.

The variance in angular turning between wheels on opposite sides of the vehicle is caused by wrapping the cables on each side around an identical cam pulley, one on each side, both of which are mounted on a common shaft so that their angular rotation is always identical while their winding radius is changing. The pair of cables are separately driven at different rates by a pair of double-acting hydraulic cylinders connected in parallel to a conventional power steering unit whereby the winding in and paying-out of the cable on the cam pulleys at different radiuses causes the wheels on opposite sides to turn at different rates.

10 Claims, 3 Drawing Sheets

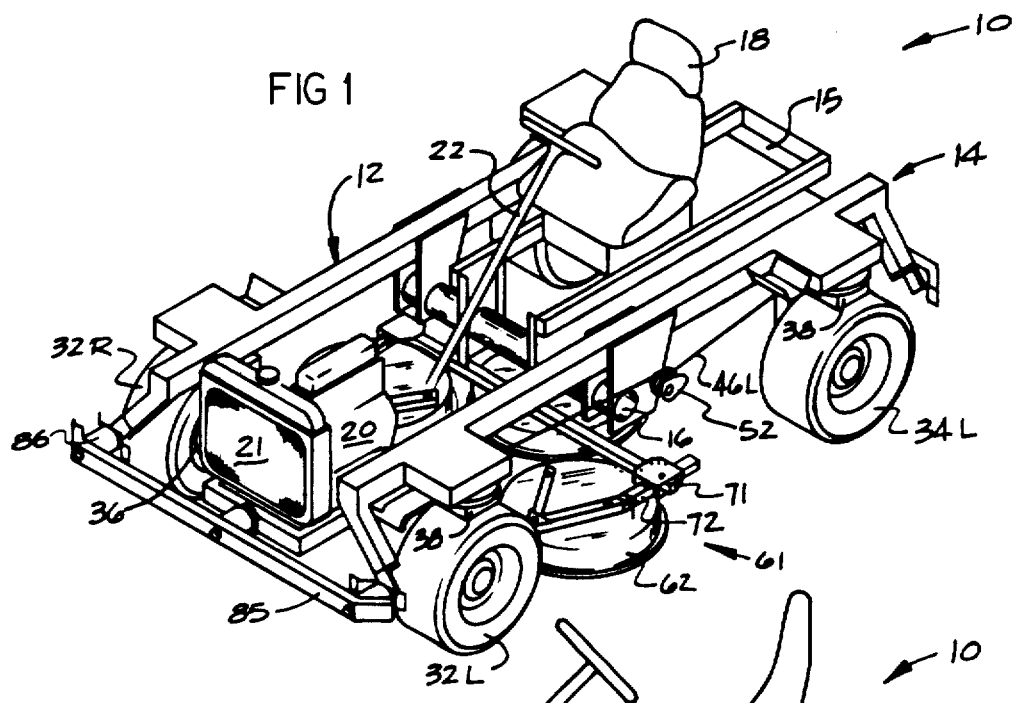
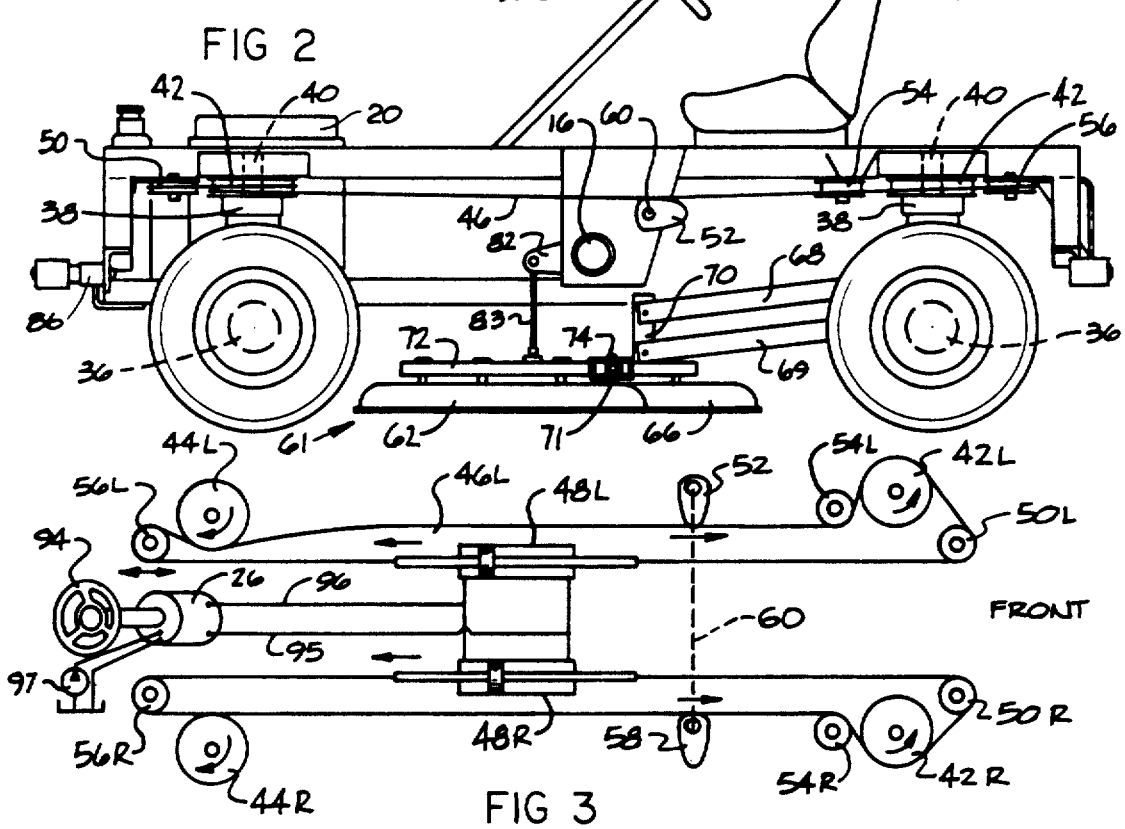

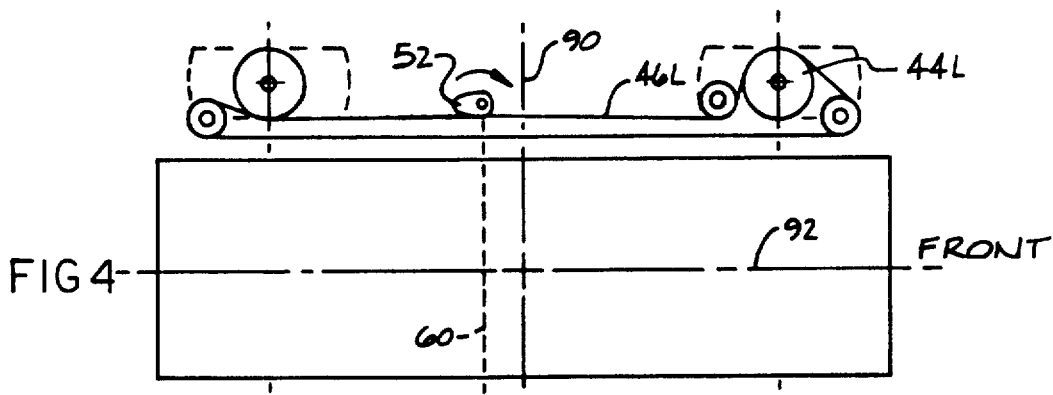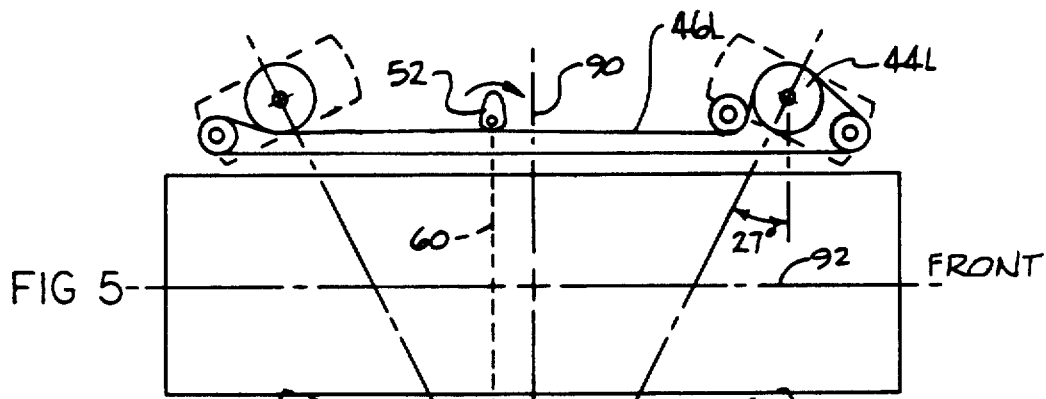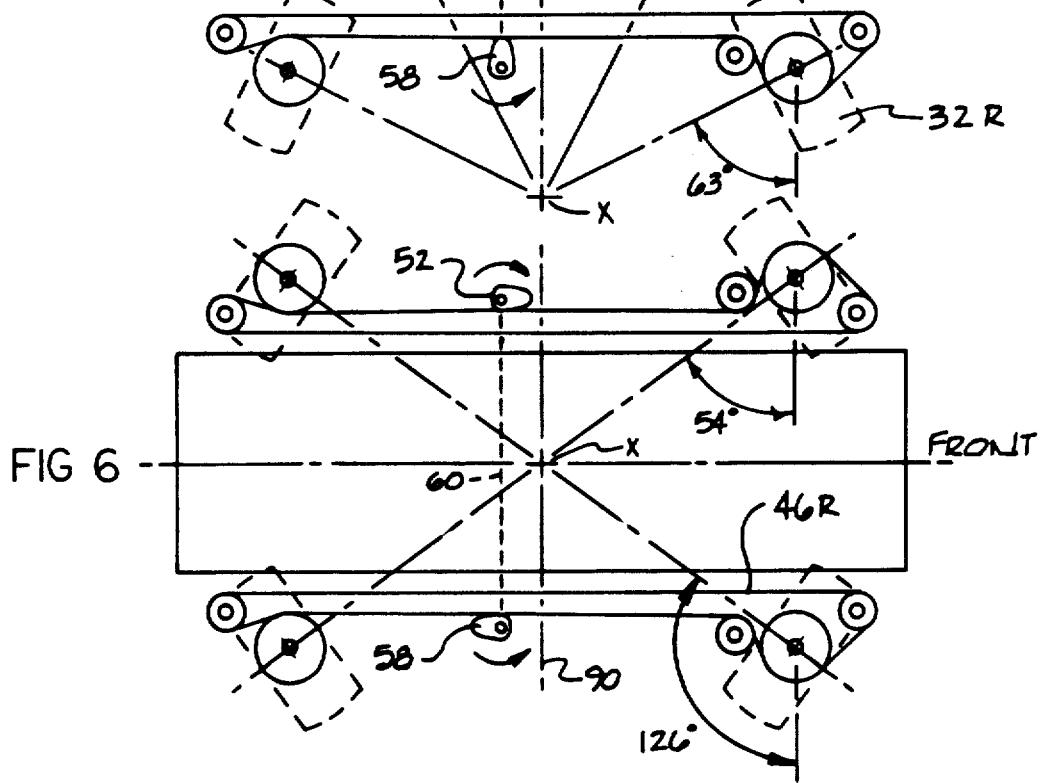

FOUR-WHEEL COORDINATED STEERING MULTI-PURPOSE TRACTOR

BRIEF DESCRIPTION OF THE PRIOR ART

Coordinated four-wheel vehicle steering is accomplished in several ways. For example, U.S. Pat. No. 4,373,603, issued to Carl D. Nelson, discloses a steering system control means for coordinating the turning movements of the rear wheels in response to the turning movements of the front wheels in a plurality of modes of operation. The patent has a sensing means which feeds an electrical signal to a control box which determines the position of the wheels in response to a selector switch selected by the operator of the vehicle.

U.S. Pat. No. 2,910,131, issued to A. S. Krotz, discloses a steering apparatus for a steered vehicle which utilizes a plurality of hydraulic cylinders and hydraulic controls for positioning the front and back wheels on each side of a vehicle in a desired direction, either longitudinally or about a radius in response to the steering commands of an operator. This patent requires an extremely complex mechanical-hydraulic apparatus in order to accomplish the desired steering for each of the four wheels.

U.S. Pat. No. 3,596,730, issued to Robert F. Cece, is another patent relating to four-wheel steered vehicles wherein a complex mechanical-hydraulic system is utilized in order to control the position of the front and rear wheels of a vehicle so that it can traverse a variety of either straight or curvilinear paths.

U.S. Pat. No. 3,504,928 issued to W. E. Reimer, illustrates a side beam suspension system wherein vertical movement of the four individual wheels causes less vertical carriage movement than conventional suspension systems.

BRIEF DESCRIPTION OF THE INVENTION

The present invention is directed toward a four-wheel drive vehicle having four-wheel steering which turns all four wheels so that their rolling axis will intersect a common point around which the vehicle will rotate, which is sometimes referred to as Ackerman-type steering. To avoid scuffing and slippage of the steering wheels as the vehicle is turning, the inboard and outboard wheels will turn at different angular rates with the rolling axis of all four wheels intersecting at a common point.

The invention also discloses a walking beam suspension system for maintaining the carriage or center frame of the vehicle in a substantially level plane while the individual wheels are deviating vertically as the vehicle traverses uneven terrain. The center frame of the vehicle supports a pair of side frames, one on each side, which in turn each support a pair of wheels, one at the front and the other at the rear of the side frame which are also journalled for steering rotation about individual vertical turning axes directly over each wheel while the two side frames are both journalled to the main frame at their center point about a common horizontal axis through the plane of the vehicle frame. Each side frame is free to rotate on its journal as the individual wheels come in contact with changes in terrain. The rotating side frames are also connected to the main vehicle frame through a pair of transverse bars, one at the front and the other at the rear, which are connected at their midpoint through a bushing joint to the center frame while the ends of each bar are connected through a like bushing joint to the right and left side frames. A similar bar is attached to the rear portion of the vehicle connecting the ends of both side frames with the center frame with similar joints.

With a conventional four-wheel suspension system, as one wheel passes over a six inch obstruction, the vehicle frame at that corner also rises six inches. However, in the present invention, with the independently walking side frames, when one wheel passes over an obstruction, the center frame will only rise half that distance, due to the geometry of the traverse bars and their midway attachment point to the center frame.

The simplified four-wheel steering system of the present invention turns the wheels on each side of the vehicle through a like angle in the opposite direction through a cable and pulley arrangement attached to each side frame which requires the front and rear wheels on each side of the vehicle to always turn through a like angle in the opposite direction. The Ackerman-type steering which is achieved between the inside and outside pair of wheels is accomplished by wrapping the control cables on each side around similar-shaped cam pulleys which are each attached to a common transverse shaft rotatably journalled to the vehicle so that the angular rotation of one cam pulley will always coincide with that of the opposite cam pulley. Since the cam pulley has a variable radius therearound, uniform rotation angles of the pulleys will achieve a varying amount of lineal cable wrapping and unwrapping as dictated by the changing cam pulley radius.

The steering cables on each side of the vehicle are controlled by a pair of double-acting hydraulic cylinders which are connected at opposite ends to the cables. The hydraulic pressure for actuating these cylinders in either direction is provided by a conventional power steering unit such as that illustrated in U.S. Pat. No. 4,043,419 wherein pressure is provided to the same end of both cylinders through a parallel circuit so that the two cylinders are not hydraulically tied together and they can move at different rates. Once the two steering cylinders are energized with pressure at a common end, their rate of lineal movement relative to each other is controlled mechanically through the transverse shaft and the respective cam pulleys around which the cables must wrap and unwrap as they move. The rate of change in the lineal movement between the two cables is governed by the particular cam pulley shape which in turn is dictated by the wheel base and track width of the vehicle on which they are utilized.

Therefore, the principal object of the present invention is to provide a highly maneuverable four-wheel steered grass-mowing vehicle with a suspension system capable of traversing uneven terrain while restricting the vehicle cutting head's vertical movement.

A further object of the present invention is to provide an improved simplified Ackerman-type four-wheel steering system which is very simple in design while achieving an infinite number of turning radiuses.

A further object of the present invention is to provide a highly maneuverable grass-mowing vehicle having a variable cutting swath with cutting heads which move transversely on the vehicle.

BRIEF DESCRIPTION OF THE DRAWINGS

FIG. 1 is a perspective view of the vehicle illustrating the suspension and steering system generally;

FIG. 2 is a side view of the vehicle illustrated in FIG. 1;

FIG. 3 is a symbolic view of the hydraulic power steering circuit along with the control cables, cam pulleys and drive pulleys in a left turn position;

FIG. 4 is a symbolic plan view of the wheel and cam positions in a straight ahead position;

FIG. 5 is a symbolic plan view of the wheel and cam positions in a right turn;

FIG. 6 is a similar symbolic plan view with the cam and wheel positions in a zero radius turn;

DETAILED DESCRIPTION OF THE INVENTION

Figure 7:
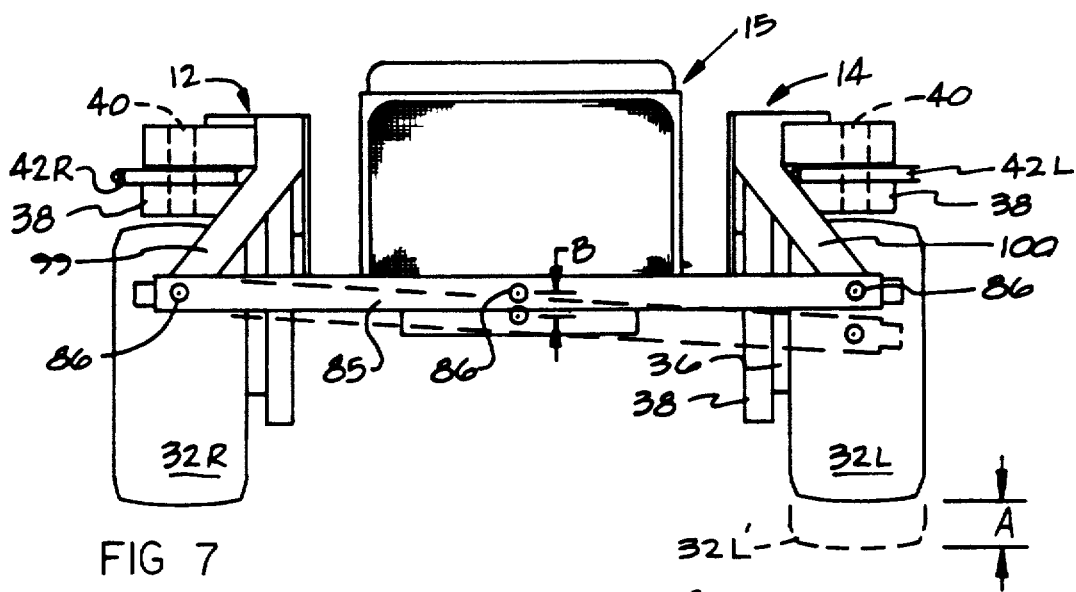
FIG. 7 is a front elevational view of the vehicle.

Referring now to the drawings wherein the preferred embodiment of the invention is shown, the tractor vehicle, generally described by reference numeral 10, includes three separate assemblies which move relative to one another, a central frame or carriage 15 and right and left side frames 12 and 14. Both side frames 12 and 14 are rotatably mounted to the center frame 15 by a common horizontal shaft or journal 16, as seen in FIG. 1. Central frame 15 comprises a platform for supporting the mower head assembly 61, seat 18, motor 20, radiator 21 and steering column 22. Attached to the lower end of steering column 22, as shown in FIG. 3, is a conventional power steering unit 26 symbolically shown, which is well-known in the prior art, as for example in U.S. Pat. No. 4,043,419, and is not described in detail.

Each of the right and left side frames 12 and 14 are essentially identical and therefore, only left side frame 14 will be described in detail. Each side frame supports a pair of wheels 32 and 34 which are driven by conventional high torque hydraulic motors 36. The wheels are directly mounted to the drive shafts of motor 36 which in turn are mounted on an L-shaped wheel bracket 38. Brackets 38 are in turn rotatably journalled to side frame 14 through a vertical shaft 40 which provides a turning axis for each wheel which is directly over the center of the wheel. Also attached to wheel brackets 38 and concentrically mounted on shafts 40, are front and rear steering pulleys 42 and 44 respectively.

The steering connection between of front and back wheels 32L and 34L is achieved through a cable 46L, which can best be seen in FIG. 3. The ends of cable 46L are connected to the opposite ends of a double-acting hydraulic cylinder 48 which has piston rods extending from both ends of the cylinder. In following cable 46L at the front of the vehicle, it first passes around idler pulley 50L and then wraps completely around steering pulley 42L and then idler 54L before it wraps twice around cam pulley 52. Cable 46L continues to the left wrapping around steering pulley 44L in the opposite direction from its rotation around front steering pulley 42. After one complete wrap around steering pulley 44L, cable 46 passes around a third idler pulley 56 and then attaches to the left piston rod of cylinder 48L for a closed loop. Idler pulleys 56 can be adjustably shifted as indicated by the arrow in FIG. 3 to adjust the tension in the cable loop. Cable 46R which is located on right side frame 12 is shown in FIG. 3 below cable 46L and is driven by a like cylinder 48R and wraps around a similar set of pulleys 50, 42, 54 and 56 in a like manner with one exception. The right and left cables 46 do not wrap around cam pulleys 52 and 58 in the same manner. In the FIG. 3 position, the left cable 46L is wrapping and unwrapping around the larger radius end of cam pulley 52 while the right cable 46R is wrapping and unwrapping around the short radius of cam pulley 58. Both cam pulleys 52 and 58 are rigidly attached to transverse shaft 60 which in turn is rotatably journalled to right and left side frames 12 and 14. Since cam pulleys 52 and 58 must move together in angular movement, the varying wrapping radiuses of the cables 46 cause differing rates on the inside and outside wheels of movement between the two cables for accommodating differing turn rates which will be described in detail in the following operation.

While the tractor vehicle of the present invention is specifically utilized as a grass mowing tractor, it has equal utility in other applications which require a highly maneuverable vehicle or platform.

Figure 8:
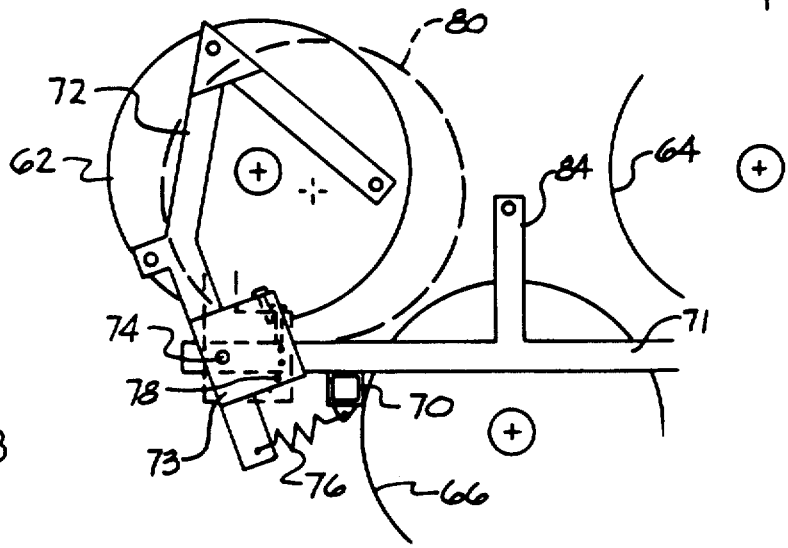
FIG. 8 is a partial plan view of the grass cutting head geometry and its lateral movement feature.

The grass mower cutting heads 62, 64 and 66, are positioned under the tractor, as best seen in FIGS. 2 and 3. The cutting heads are supported by a parallelogram structure including a pair of horizontal links 68 and 69 which are pivotally connected to the center frame and to a vertical link 70. Attached to link 70 is a transverse beam member 71 which in turn supports a mower head support arm 72 in a cantilevered manner, as shown in FIG. 8. Support arm 72 includes an expanded lateral section 73 through which a pivot pin 74 extends through beam 71. Arm 72 includes an extension extending past its pivot pin 74 for providing an attachment point for tension spring 76, as seen in FIG. 8. Spring 76 which in turn is anchored to beam 71 attempts to swing mower head 62 and its support arm 72 outward until limit stop bolt 78 comes in contact with transverse beam 71. Bolt 78 can be positioned in a plurality of holes which will vary the outward extension of head 62 which will vary the cutting swath of the tractor 10. Due to the tension from spring 76, the mowing head 62 and its support arm 72 can be deflected inwardly when an obstruction is encountered to the dotted line position 80, as shown in FIG. 8.

The vertical height of the cutting heads is controlled by a rotating arm 82 (FIG. 2) which connects to the mower head assembly 61 through cable 83 and stub shaft 84, as shown in FIG. 8. The lifting cable 83 varies the height of mower head assembly 61 while the links 68 and 69 maintain the mower assembly in a horizontal plane regardless of its height.

The grass mower heads are conventional in design and can be driven by a variety of means such as hydraulic motors, and the details of which are not shown in the drawings since they are not a part of the present invention.

The suspension system of the vehicle includes two side frames 12 and 14 pivotally joined to the carriage or center frame 15 of the vehicle, as previously discussed. Each side frame is also connected to the center frame of the vehicle by transverse bars 85, as seen in FIGS. 1 and 7. Bar 85 is pivotally mounted at its center to center frame 15 by a bolt and rubber mounts 86. The outer ends of bar 85 are also rotatably connected to extension arms 99 and 100 on side frames 12 and 14 through a similar bolt and rubber mounts 86 so as to allow a degree of lateral movement of the bolts and mounts as the individual wheels move upward or downward.

Extension arms 99 and 100 extend outward so that bolts 86 on opposite sides of tractor 10 have the maximum space therebetween which in turn allows the minimum angular rotation of bar 95 and lateral movement of the bolts.

SUSPENSION SYSTEM OPERATION

The operation of the suspension system can be best illustrated by referring to FIGS. 7 and 1. As the vehicle 10 is traversing an uneven surface and its front left wheel 32L drops in a depression as indicated in by 32L', the left side beam 14 of the vehicle will rotate on its horizontal shaft 16. In looking at the front of the vehicle in FIG. 7, the horizontal bar 85 will drop a distance "A" similar to wheel 32L while the center frame 15 will only drop a distance "B" as indicated at its center point. While the individual four wheels can experience substantial vertical movement, due to the suspension system the center frame 15 of the vehicle will have substantially less movement in the vertical plane to that of conventional vehicles thus minimizing the tilting and vertical shift of the cutting head assembly 61 of the vehicle.

STEERING OPERATION

Figure 9:
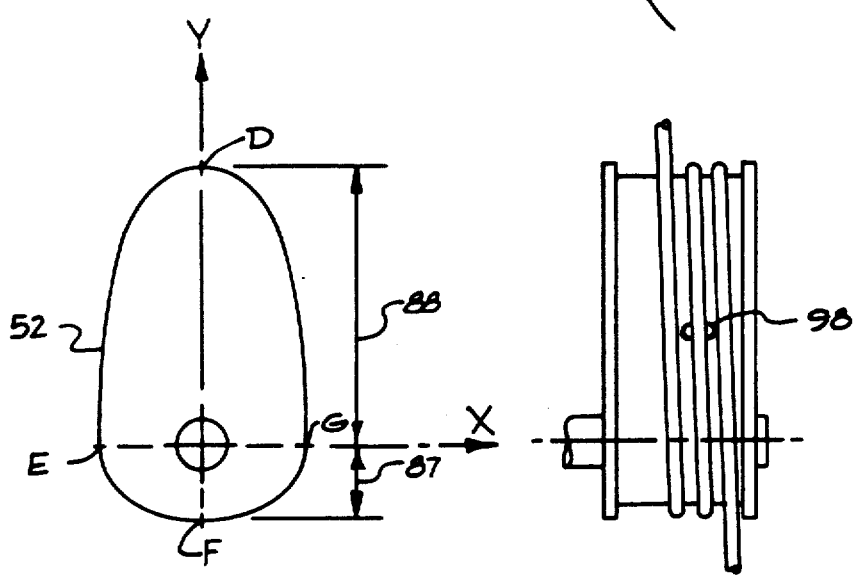
FIG. 9 is a plan view of the drive pulley.

With four-wheel Ackerman-type steering, the scuffing or slipping of the wheels during turns is essentially eliminated which minimizes damage to the turf. The rate of turning between the inboard and out board wheels is controlled by the shape of the cam pulley 52, as shown in FIG. 9. The minimum and maximum wrapping radiuses 87 and 88 are dictated by the wheel base and tract width of the particular vehicle. As for example, In the FIG. 5 illustrated turn, the inboard wheel is turned through an angle of 63° while the outboard wheel has turned through a 27° angle. If the track width of the wheels was made wider than as illustrated, it can readily been seen that the angular difference between the inboard and outboard wheels will increase.

With the vehicle wheels in the straight ahead non-turning position as illustrated in FIG. 4, the turning radius of the vehicle is essentially infinity until a turn is initiated. Since both the forward and rear outboard pair of wheels turns through a like angle in opposite directions, the intersecting point of the rolling axis (point X) will always lie along transverse line 90 at some lateral distance from the center line 92 of the vehicle. This distance will be referred to as the turning radius of the vehicle.

Cam pulleys 52 and 58, which have identical shapes, are illustrated in FIGS. 3, 4, 5 and 6 turned 90° from their actual position merely for purposes of illustration so that the position of the cam with regard to its steering cables wrapped therearound can be seen in the plan views of the vehicle. In actuality, cam pulleys 52 and 58 lie in vertical planes, as seen in FIG. 2, and rotate about a common shaft 60.

From the straight ahead position, as illustrated in FIG. 4, to the right turn position of FIG. 5, the cam pulleys 52 and 58 and their connecting shaft 60 will be rotated 90° to the FIG. 5 position. When cam pulley 52 is rotated clockwise 90° from its FIG. 4 position, the cable 46L will wrap from point E to point F (see FIG. 9) which in the specific example is a distance of 2.11 inches along the circumference of the cam pulley. In the specific example, the wheel base of the vehicle is 75 inches, the tread width is 54.6", the steering pulleys are 9" in diameter, the minimum cam pulley radius 87 is 1.1" and maximum pulley radius 88 is 4.3 inches. Lineal movement of the left cable 46L a distance of 2.11 inches will cause a 9 inch steering pulley 44L to rotate through roughly 27°, as indicated in FIG. 5. Rotation of cam pulley 58 in a counter-clockwise direction 90° from its FIG. 4 position will cause the right cable to wrap a circumferential distance which computes to 4.95 inches on the cam circumference. This lineal movement of the right cable will turn front wheel 32R through an angle of approximately 63°, as shown in FIG. 5, with the rolling axes of the inside and outside wheels intersecting at point X, the center of rotation of the vehicle. The turning radius of the vehicle in this position is approximately 46 inches from point X to the center line 92 of the vehicle.

Figure 10:
FIG. 10 is a perspective view of the pulley with a portion of its control cable wrapped therearound.

In FIG. 6, the wheels have been turned to the right as far as possible with the outboard wheels turning approximately 54° while the inboard wheels have turned 126°. The point X about which the vehicle turns is now the center point of the vehicle and therefore the turning radius is now zero since the vehicle merely rotates about point X. As can be seen in this position, the cam pulleys have both been rotated through 180° which for the outboard wheels is a lineal distance on the cam pulley circumference between points G, F and E, while the lineal distance traveled by the inboard cable 46R is the circumferential distance on the cam pulley between points G, D and E. Again, as in all other wheel positions, the rolling axes of both the inboard and outboard wheels will intersect along traverse line 90 which is half way between the front and back wheels 32 and 34. Cable 46L or R is wrapped around either of camp pulleys 52 or 58 two complete times as shown in FIG. 10 since complete right and left turns involve rotation of the cam pulley through 360°. The cable 46 is anchored to the cam pulley surface by a u-bolt 98, as shown in FIG. 10, to prevent any sliding of the cable on the pulley. Similar anchors are provided on steering pulleys 42 and 44. If the diameter of steering pulleys 42 and 44 were changed, the cam pulley 52 would also need to be changed in size proportionally. The shape would remain the same but the circumference of the cam pulley must be equal to half of the circumference of the steering pulley.

The shape of the cam pulley can be empirically calculated with FIG. 9 and the following.

$$Y = \sqrt{1.227 - 4.985X^2} \text{ For } Y \leq 0$$

$$Y = \frac{(.680X + .249Y)^2}{.533} + 2.724X - 6.411 \text{ For } Y \geq 0$$

FIG. 3 illustrates the positions of the control cylinders 48, wheels and cam pulleys after a left turn comparable to the right turn of FIG. 5. A left turn of steering wheel 94 causes power steering unit 26 to direct pressure from pump 97 through line 95 to the right end of both cylinders 48L and 48R, while line 96 connected to the opposite end of both control cylinders is open to drain. Both the piston rods in the right and left cylinders 48 will move at different rates since cam pulley 52 and cam pulley 58 must move together in angular rotation while the respective cables on opposite sides are winding up and paying-out at different rates, as previously discussed. From comparing the FIG. 4 and the FIG. 3 position, it can be seen that cam pulley 52 is wrapping towards its maximum radius and therefore the piston in cylinder 48L has moved farther to the left than the piston in cylinder 48R which has wrapped a lesser lineal distance EF (see FIG. 9). Leftward movement of both cables causes the wheels 42L and 42R to turn to the left as indicated by the arrows, while rear wheels 44L and 44R turn in the opposite direction as indicated by the arrows. To return the wheels to the straight ahead position, steering wheel 94 is merely turned in a clockwise direction so that power steering unit 26 drains line 95 while pressurizing line 96 to cause the hydraulic cylinders to return to their centered positions.

The transverse line 90 on which the rolling axis of the wheels intersect is located behind the mover head assembly 61 so that the four-wheel steering of the present systems responds like conventional two-wheel steering.

While not shown in the drawing, the cam pulley surface could include a spiral groove in its surface for receipt of the wrapped cable 46 to assist in preventing the cable from wrapping on itself. Another alternate configuration not illustrated, would be to substitute a roller type chain for the cables 46, or at least that portion of the cable which tightly wraps around the cam pulleys 52 and 58. If a roller chain was used for a portion of the cable, the cam pulley 52 would include teeth for receiving the chain.

Having described the invention with sufficient clarity to enable those familiar with the art to construct and use it, we claim:

1. Apparatus for controlling the longitudinal direction of movement of a motorized vehicle comprising:
   (a) a frame means lying in a horizontal plane;
   (b) first and second pairs of wheels each pair including a front and back wheel on each side of the vehicle;
   (c) journal means mounting each of said wheels to said frame means for rotation about individual turning axes perpendicular to said plane;
   (d) first and second turning means coupled to said individual turning axis of the journal means for rotating said first pair of wheels in opposite directions from each other, and said second pair of wheels in opposite directions from each other, respectively;
   (e) a shaft transversely rotatably mounted on the frame;
   (f) first and second cam pulley means each having symetric halves being rigidly mounted on said shaft for rotation therewith;
   (g) steering means including a steering wheel transmitting linear movement to the first and second turning means; and
   (h) means for coupling said first and second cam pulley means to said first and second turning means, respectively, each of said cam pulley means being configured in symetric halves with the turning means wrapped therearound in a manner to cause said first and second pairs of wheels to follow a first and second circumference, both having a common center, when said steering wheel is turned, said common center lies upon a transverse line half way between the front and back wheel of each pair.

2. Apparatus as claimed in claim 1, wherein said first and second turning means each comprises a first and second pulley attached respectively to said journal means of each wheel, cable means passing around said first and second pulleys in opposite directions and around the cam pulley means whereby the wrapping and unwrapping of the cable means around the cam pulley means causes varying rates of rotation between the first and second pairs of wheels.

3. Apparatus as claimed in claim 2, wherein said cable means comprises wrapping the cable around the cam pulley at least 720° and anchoring the cable to a cam pulley surface at a point thereon.

4. Apparatus as set forth in claim 2, wherein the steering means includes a steering wheel controlled conventional power steering unit with two working ports, a pair of double acting hydraulic cylinders each connected to the cable of the first and second turning means respectively to provide differing linear movement to said cables, and the two working ports of the power steering unit are connected to the opposite ends of both hydraulic cylinders in parallel whereby the cylinders can move at differing linear rates.

5. Apparatus as claimed in claim 1, including a plurality of grass mowing heads attached to the frame of said vehicle, at least one of said heads is supported on a cantilevered arm which is pivotally mounted to said frame for movement in a horizontal plane about a vertical axis, biasing means attached to said arm urging the head laterally outward in the same horizontal plane whereby the head can be deflected inward as the head contacts an obstruction.

6. Apparatus as claimed in claim 1, including three grass mowing heads positioned in a horizontal plane and attached to the frame; the two outer heads being supported on cantilevered arms pivotally mounted to the frame about a vertical axis for lateral movement of said outer heads; biasing means attached to said arms urging said heads laterally outward whereby a head may be deflected when an obstruction is contacted and adjustable stop means on said arms permitting adjustable lateral positioning of said outer heads to change the overall cutting width of the vehicle.

7. Apparatus as set forth in claim 1, wherein the cam pulley means includes a circumferential cam surface having a changing radius about its axis of rotation which from its minimum radius to its maximum radius turns through 180° degrees and is symmetric in shape with the other half of the cam surface.

8. Apparatus as set forth in claim 2 wherein the cable means is wrapped around the first and second cam pulley means two complete turns.

9. Apparatus as set forth in claim 2 wherein both cam pulley means are identical in shape but the cable means on the firt cam pulley means separates from the cam pulley at a point on the cam pulley 180° from the point the cable means separates from the second cam pulley means.

10. Apparatus for controlling the longitudinal direction of movement of a motorized vehicle comprising:
   (a) a frame means lying in a horizontal plane including a center frame and first and second side frames;
   (b) first and second pairs of wheels;
   (c) wheel brackets for rotatably supporting each of said wheels about their rolling axis;
   (d) journal means mounting the side frames to the center frame and each of said wheel brackets and wheels to said side frames for rotation about a first axis parallel to a plane through said frame means; and the wheels about individual turning axes perpendicular to said plane and intersecting the rolling axis of each wheel;
   (e) first and second turning means coupled to said individual turning axes of the journal means for rotating said first pair of wheels on one side frame in opposite directions from each other, and said second pair of wheels on the other side frame in the opposite direction from each other, respectively;

(f) a shaft transversely rotatably mounted on the frame means;

(g) first and second cam pulley means each having symetric halves being rigidly mounted on the shaft for rotation therewith;

(h) steering means including a steering wheel transmitting linear movement to the first and second turning means; and (i) means for coupling said first and second cam pulley means to said first and second turning means, respectively, each of said cam pulleys being configured in symetric halves with the turning means wrapped therearound in a manner to cause said first and second pairs of wheels to follow a first and second circumference, both having a common center, when said steering wheel is turned, said common centers lie upon a transverse line half way between each pair of wheels.

* * * * *